United States Patent [19]
Munnerly et al.

[11] 3,888,569
[45] June 10, 1975

[54] APPARATUS AND METHOD OF MEASURING THE REFRACTIVE ERROR OF AN EYE

[75] Inventors: Charles R. Munnerly, Fairport; Bruce R. Obinson; James W. Horwitz, both of Rochester, all of N.Y.

[73] Assignee: Tropel, Inc., Fairport, N.Y.

[22] Filed: Apr. 29, 1974

[21] Appl. No.: 465,274

Related U.S. Application Data

[63] Continuation of Ser. No. 358,702, May 9, 1973, abandoned.

[52] U.S. Cl. ............... 351/6; 250/225; 351/8; 351/9; 351/14; 351/39; 356/126; 356/132
[51] Int. Cl. ...... A61b 3/00; A61b 3/10; G01n 21/46
[58] Field of Search ............... 351/6–9, 12, 351/14, 16, 39; 356/126, 132; 250/205, 225

[56] References Cited
UNITED STATES PATENTS

3,663,098  5/1972  Merchant.............................. 351/6
3,791,719  2/1974  Kratzer et al. ...................... 351/9 X
3,819,256  6/1974  Bellows et al. ........................ 351/6
3,824,005  7/1974  Woestman ............................ 351/8

*Primary Examiner*—Paul A. Sacher
*Attorney, Agent, or Firm*—Stonebraker, Shepard & Stephens

[57] ABSTRACT

A method of measuring the refractive error of the eye uses a digital computer and directs a variable focus, variable orientation light pattern on the eye, detects the light pattern reflected from the retina to produce an analog signal as a function of the focus of the reflected pattern, and converts the analog signal to a digital signal stream fed to the computer. The computer varies the focus of the pattern and the orientation of the pattern and selects and stores results from the digital signal stream. It then fits a sine wave to the selected signal results, and calculates the refractive error from the sine wave.

26 Claims, 3 Drawing Figures

APPARATUS AND METHOD OF MEASURING THE REFRACTIVE ERROR OF AN EYE

This is a continuation of application Ser. No. 358,702, filed May 9, 1973, and now abandoned.

THE INVENTIVE IMPROVEMENT

Automatic, objective measurement of the refractive error of the eye has long been sought, but many problems have prevented success. First, it is difficult to produce a usable signal from reflected light from the retina of the eye, and then it is difficult to use such a signal in an eye examination method producing accurate and reliable results. Some previous devices have used a signal from light reflected from the retina of the eye to drive servo-mechanisms seeking null positions, and other analog devices have been attempted. These have generally been unreliable in various circumstances and have lacked any capacity to determine the reliability of their own output.

The invention involves a full analysis of the problems in objectively measuring refractive error of the eye and an understanding of the disadvantages of the prior art attempts to solve the problems. The invention proposes a refractive error measuring method beginning with a usuable signal and using a digital computer. The invention aims at reliability, accuracy, practicality, simplicity, economy, and ease of operation in an instrument capable of checking its measurements for probable error before providing an output.

SUMMARY OF THE INVENTION

In the inventive method of measuring the refractive error of the eye, a variable focus, variable orientation light pattern is directed on the eye, and the light from the pattern reflected from the retina of the eye is detected to produce an analog signal as a function of the focus of the reflected pattern. The analog signal is converted to a digital signal stream and fed to a digital computer which varies the focus of the pattern and the orientation of the pattern and stores selected results of the digital signal stream. The computer then fits a sine wave to the selected signal results, and calculates the refractive error from the sine wave. If the deviation of the selected signal results is excessive, then either deviant measurements are repeated or error calculations are deferred until re-examination.

DRAWINGS

DETAILED DESCRIPTION

Figure 1:
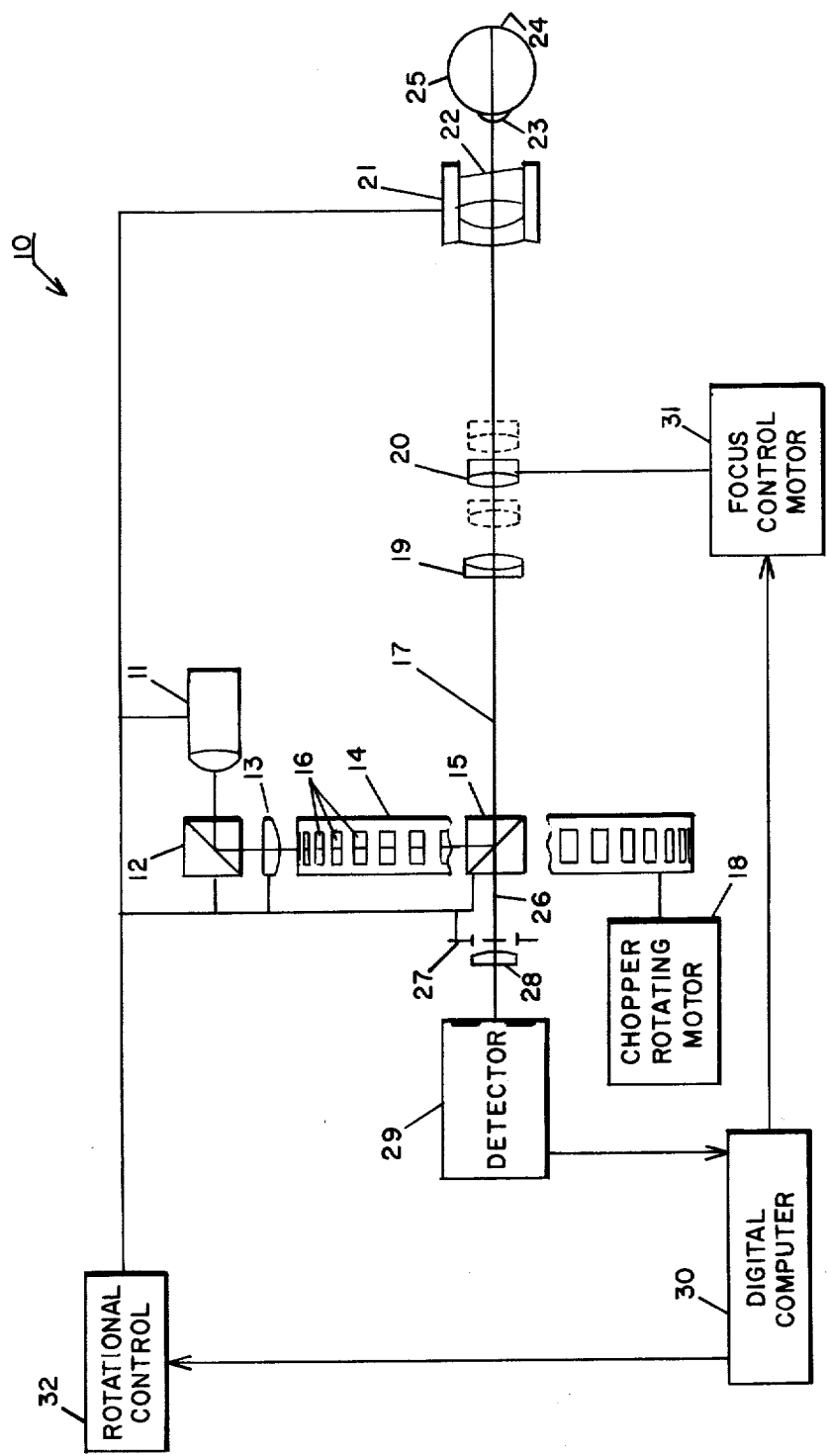
FIG. 1 is a schematic view of an optical system operated under control of a digital computer according to the inventive method.

The inventive method requires an optical system that can direct light onto an eye to be examined and monitor the light reflected from the retina of the eye to produce a usable signal. FIG. 1 shows one preferred embodiment of an optical system 10 for accomplishing this, and other optical systems can also be used. Generally, any such system directs a light pattern onto the eye and has capacity for varying the focus and orientation of the light pattern so that the output signal is a function of the focus of the reflected pattern at various orientations. There are several ways that this can be done, but optical system 10 of FIG. 1 is preferred.

A source 11 directs infra red light on polarizing beam splitter 12 which polarizes a portion of the light directed through condenser lens 13 and chopper reticle 14 to a second polarizing beam splitter 15. Reticle 14 is drum shaped with evenly spaced slits 16 and is rotated on the axis of light path 17 by a motor 18. This chops the light and forms it into a pattern of moving bars that are evenly spaced apart, preferably by a distance equal to the width of the bars. The pattern of moving bars passes through collimator lens 19, axially movable focusing lens 20, and eyepiece 21 which includes a quarter-wave plate 22. The light then passes through the cornea 23 to the retina 24 of eye 25 and reflects from retina 24 back along light path 17 to polarizing beam splitter 15. Quarter-wave plate 22 orients reflected polarized light so that it passes straight through polarizing beam splitter 15 on output path 26.

A mask 27 on output path 26 has a bar pattern corresponding to the bar pattern produced by reticle 14, and the moving bars of reflected light pass over mask 27. If the reflected bars are in sharp focus, they produce maximum signal modulation at the frequency established by rotating reticle 14, and as the focus clarity of the bars reduces, the modulation of the signal also diminishes.

A focusing lens 28 directs the output light onto a detector 29 which can be a photomultiplier tube or other light responsive detector. The electronic output from detector 29 is processed and fed to a digital computer 30 which controls the movement of focusing lens 20 through a motor 31 that is preferably a stepping motor. The position required for focusing lens 20 to produce optimum focus in the reflected bar pattern indicates refractive error in eye 25.

To orient the bar pattern relative to eye 25, several elements are rotationally positioned around the axis of the light path 17 by a rotational control motor 32 controlled by computer 30. As schematically illustrated, motor 32 rotates eyepiece 21, source 11, beam splitter 12, condenser lens 13, beam splitter 15 and mask 27. By changing the rotational angle of these elements relative to light path 17, the tilt or orientation of the bar pattern relative to eye 25 is changed to measure the refraction error of eye 25 in different meridians.

Computer 30 then operates rotational control motor 32 and focus control motor 31 to examine eye 25 in predetermined steps leading to a computation of the refractive error of eye 25. For example, focus control motor 31 can be moved in steps throughout its possible range of movement for each meridian setting of the bar pattern under control of the rotational control motor 32, with the refractive value for optimum focus for each setting being selected and stored by the computer.

Computer 30 then fits a sine wave to the selected signal results representing the refractive value for optimum focus for each meridian and calculates the refractive error from the sine wave. To ensure accuracy of the result, the computer preferably checks the deviation of the selected signal results from the sine wave before calculating refractive error, and if the deviation is too large, the computer's output indicates that the test was not satisfactory. If the deviation is small enough, the computer prints out the refractive error, preferably in a standard form.

Computer 30 can be programmed to seek for optimum focus in the most likely range of positions of focusing lens 20 for any selected meridian to shorten the examination time and reduce the amount of data. This is done by using refractive values producing previous optimum focus to predict the likely regions of subsequent optimum focus, and varying the focus only through such likely regions. Since the optimum focus produces a peak in the output signal, signals on either side of a peak ensure that the optimum focus has been determined for any particular meridian. Computer 30 can select a few refractive values producing optimum focus and fit these to a sine wave instead of finding the optimum focus for each 5° meridian throughout a 180° sweep of the eye. The number of meridians investigated depends upon the accuracy desired, with more information generally yielding higher accuracy but taking longer. An optimum solution is the most information that can be gathered and processed in a little less than half a minute so that the patient's eye does not have to be maintained in examinable state very long.

The inventive method using a digital computer inherently avoids errors involved in analog systems. For example, unavoidable errors occur in varying the orientation of the reticle pattern and moving the focusing lens, and an example is that light source 11 may move slightly eccentrically of optical axis 17 and vary the light strength and signal amplitude. Any system tries to avoid such errors, but they can never be eliminated completely, and the exact effect of any such error is inherently unknown. Such errors introduce amplitude variations that cause serious inaccuracies for analog systems, but such errors do not empair the inventive digital method. The optimum focus for each meridian investigated is a detectable peak in the output signal regardless of variations in amplitude. The diopter position of the focusing lens when the signal peak occurs is an accurate indication of the refractive value on the meridian being investigated, and amplitude errors in the output signal do not change or affect this finding. After a sufficient number of refractive values are determined, and about 6 values are preferably selected in the high amplitude regions of the prospective sine wave, a sine wave can be fitted to the data and the refractive error calculated without error from any optical system inaccuracies affecting the signal strength.

The examination of the eye must be done with the eye relaxed and gazing at infinity in an unaccommodated state, and occasionally a patient accommodates his eye to a nearer focus for some reason during the test. This produces errors in the output data and causes problems with objective refractors. The inventive method can compensate for this in several ways. First, optical system 10 is designed to induce the eye to gaze at infinity, but if any nearer focus accommodation occurs during part of the examination, the data collected during the accommodation will be off the sine curve fitting the other data. Then the deviation of the resulting data from the sine curve will exceed a standard selected to ensure accuracy, and the computer can signal a retest or otherwise indicate that the test was unsatisfactory. The computer can also be programmed to remeasure the deviating data in another attempt to secure data fitting a sine curve so that refraction error can be calculated. Prior art devices lacked such an accuracy determining capacity.

Movement or misalignment of the eye with the instrument can also spoil test results, but computer 30 can determine this by a similar check on the deviation of the data from a sine wave. Then such errors can be corrected on a retest.

The preferred way of determining the deviation of the selected data from the sine wave is by calculating the RMS of such deviation. If the RMS deviation exceeds a predetermined value set for the desired accuracy of the refraction error calculation, the computer can print out that the test was unsatisfactory, and can also print out the actual RMS deviation value as an indicator of whether the test was a near miss or grossly erroneous. The former might justify a rerun, and the latter a check for some eye condition preventing examination. Other methods of calculating the data deviation from the sine curve can also be used.

An eye blink often occurs during an examination and also introduces errors into the data. Previous devices and methods had no way to compensate for an eye blink, but the inventive method does. This is best shown in the following description of FIGS. 2 and 3.

Figure 2:
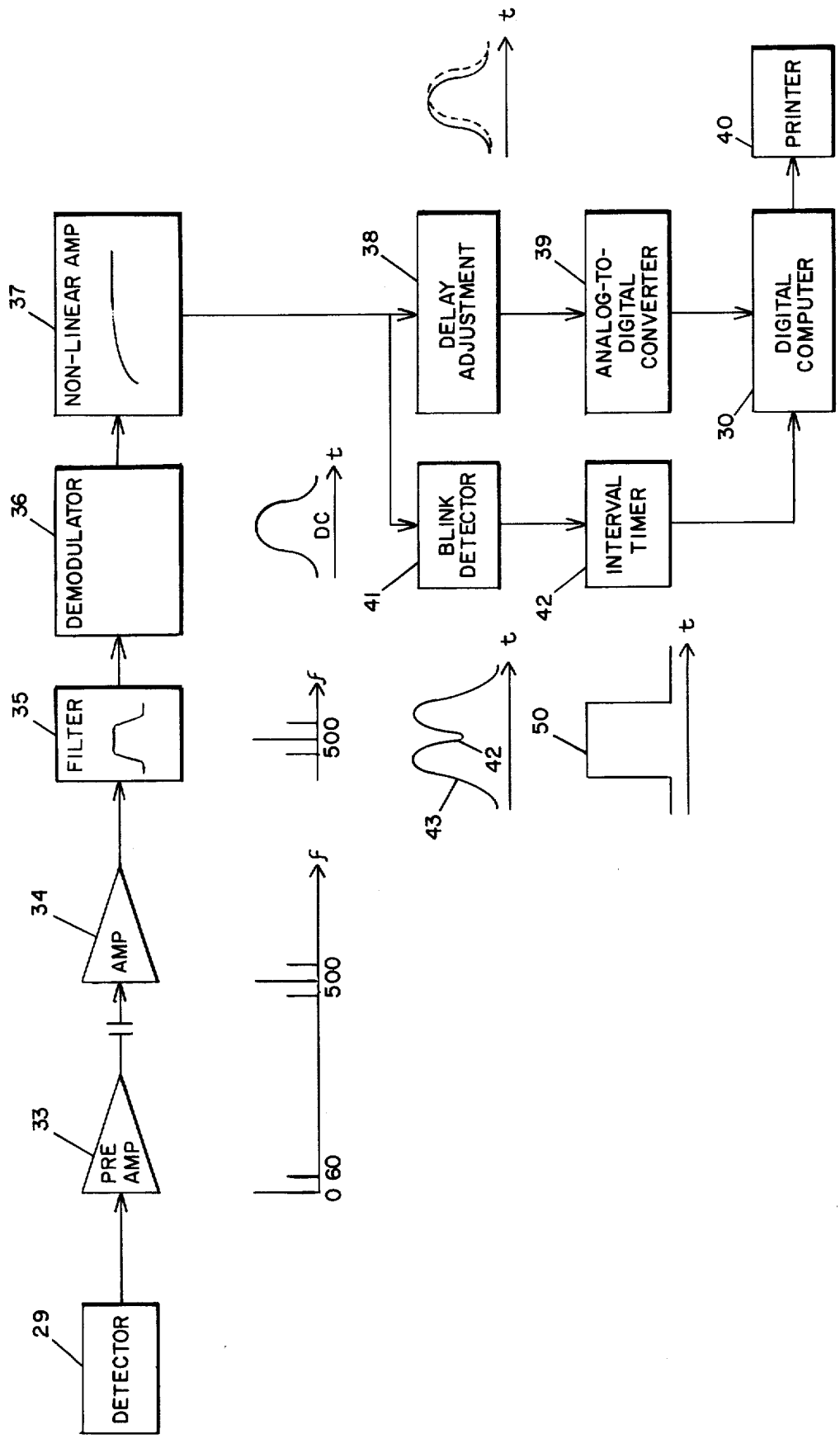
FIG. 2 is a schematic view of preferred signal processing according to the inventive method.

Referring to FIG. 2, the output signal from detector 29 is fed to a preamplifier 33 capacitively coupled to an amplifier 34. With chopper reticle 14 rotating to chop the light into a bar pattern at a frequency of preferably about 500 Hz, the signal at the amplifier stage contains a 500 Hz component with side bands for doppler effect as pattern rotation or focus adjustment occurs, and also includes a 60 Hz component, and a DC component from ambient light. This signal is fed to filter 35 which preferably passes 500 Hz ± 50 Hz to select all the usable signal bands. The output from filter 35 is rectified in a demodulator 36 to produce a DC analog output fed to a non-linear amplifier 37 serving as a gain control.

The analog signal from amplifier 37 is fed to a delay adjustment circuit 38 that delays the output signal a few milliseconds behind the input signal, and the output from delay circuit 38 is fed to analog-to-digital converter 39 which feeds the result to digital computer 30. The refraction error eventually calculated by digital computer 30 is output through printer 40.

Blink detector 41 is arranged in a parallel path between amplifier 37 and computer 30 and is not subject to delay circuitry 38. In response to a blink signal 42 occurring in analog signal 43, blink detector 41 triggers a blink interval timer 42 to signal computer 30 instantly at the beginning of a blink so that computer 30 delays the examination for a predetermined interval slightly exceeding the expected duration of the blink and preferably about 400 milliseconds. During the 400 millisecond delay in which the blink is completed, computer 30 stops movement of focusing lens 20 and ignores the digital data relating to the blink interval and reaching computer 30 a few milliseconds after the blink begins. The examination then resumes until another blink occurs so that all data during a blink is effectively ignored.

Figure 3:
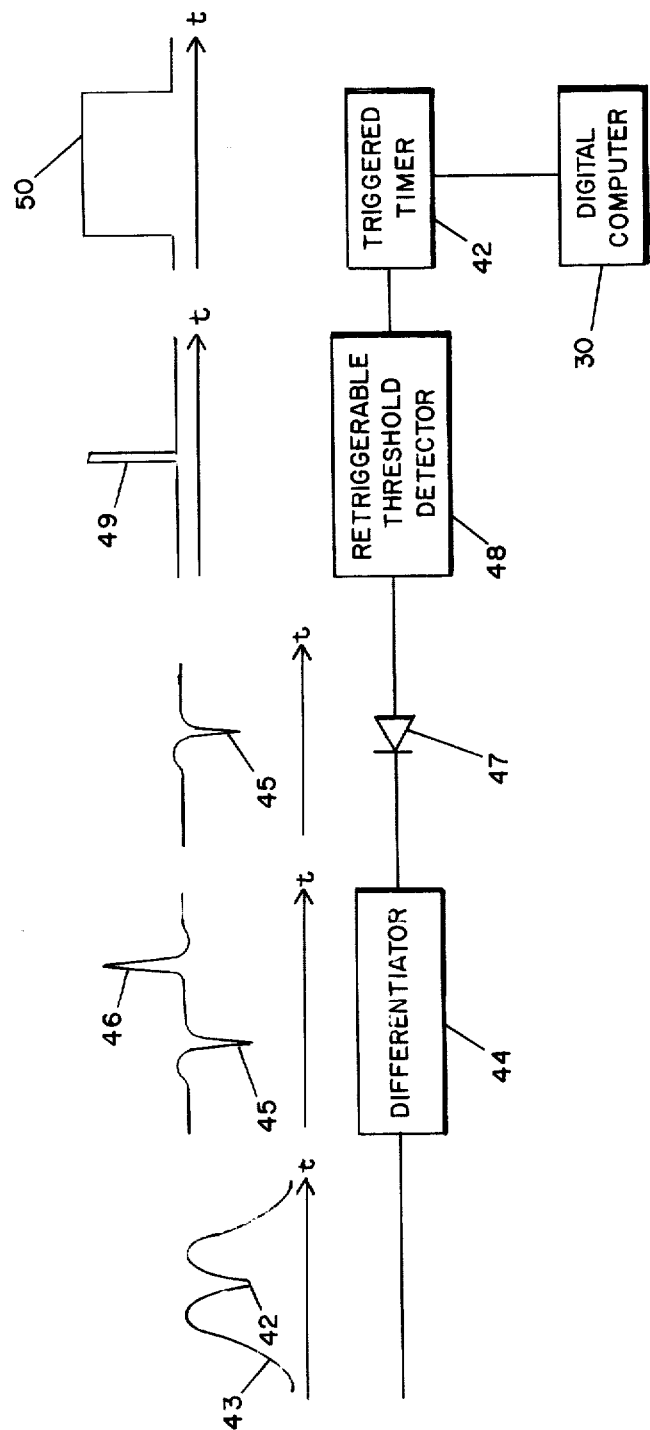
FIG. 3 is a schematic view of a blink detector used in the inventive method.

FIG. 3 shown the operation of blink detector 41 relative to an analog signal 43 containing a blink signal 42. This is fed to differentiator 44 which responds to the rate of change of the incoming signal to produce a spike 45 at the beginning of a blink and another spike 46 at the end of a blink. Diode 47 passes only the initial spike 45 representing the beginning of a blink, and a retriggerable detector 48 produces an output pulse 49 whenever spike 45 has sufficient amplitude to indicate beginning of a blink. Pulse 49 triggers timer 42 to produce a blink interval pulse 50 of a predetermined length such as 400 milliseconds to exceed the expected length of a blink. Pulse 50 is fed instantly to computer 30 which stops the examination for a blink delay as previously described. Delay circuit 38 of FIG. 2 ensures that the blink interval pulse 50 reaches computer 30 before any blink distortion in the data from converter 39. Computer 30 then ignores the data from converter 39 until expiration of blink interval pulse 50 and then resumes the examination.

Operation of the inventive method under the control of digital computer 30 offers many advantages not achieved by prior art analog systems. No error signal output is required to drive a servo-mechanism, and a digital control method can check the accuracy of its data before producing an output. The method is not subject to error from unavoidable amplitude variation in the output signal, and the computer can check the accuracy of its own data and remeasure deviant data. The inventive method has a wide range of capacity and does not require that a moderately good focus be achieved before the test can begin. The program for computer 30 can be arranged in many ways as will be understood by those skilled in the art for checking different focal ranges at different meridians to secure the desired data.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spririt of the invention. For example, those skilled in the art will appreciate the many variations available in practicing the inventive method.

I claim:

1. In a method of measuring the refractive error of an eye by directing a pattern of radiant energy into said eye and detecting the focus of the radiant energy reflected from said eye, the improvement comprising:
    a. converting the analog signal from said focus detection to a digital signal stream;
    b. feeding said digital signal stream to a digital computer;
    c. programming said digital computer to vary the focus and orientation of said radiant energy pattern directed into said eye;
    d. storing selected results of said digital signal stream in said computer; and
    e. programming said computer to use an algorithm to calculate said refractive error from said selected signal results.

2. The method of claim 1 including programming said computer to fit a sinusoidal function to said selected signal results and to calculate said refractive error from said sinusoidal function.

3. The method of claim 1 including programming said computer to check the deviation of said selected signal results from said algorithm.

4. The method of claim 2 including programming said computer to calculate the RMS deviation of said selected signal results from said sinusoidal function.

5. The method of claim 1 including selecting said signal results as representations of the eye refraction value at optimum focus of said reflected pattern.

6. The method of claim 1 including detecting the beginning of a blink, and programming said computer to stop examination of said eye during said blink.

7. The method of claim 6 including using a differentiator and a threshold detector for detecting said beginning of said blink.

8. The method of claim 1 including programming said computer to produce said selected signal results without moving throughout the range of focus variation for each orientation of said pattern.

9. The method of claim 1 including programming said computer to vary said focus for each of a sequence of angular orientations of said pattern and to select the eye refraction value producing optimum focus for each of said angular orientations.

10. The method of claim 9 including programming said computer to use said eye refraction values producing optimum focus at previous angular orientations to predict the likely regions of optimum focus for subsequent angular orientations, and varying said focus in said likely regions.

11. The method of claim 1 including programming said computer to fit a sinusoidal function to said selected signal results and to calculate said refractive error from said sinusoidal function, and selecting said signal results as representations of the eye refraction value at optimum focus of said reflected pattern.

12. The method of claim 11 including programming said computer to calculate the RMS deviation of said selected signal results from said sinusoidal function.

13. The method of claim 12 including detecting the beginning of a blink, and programming said computer to stop examination of said eye during said blink.

14. In an appratus for measuring the refractive error of an eye, said apparatus having means for directing a pattern of radiant energy into said eye and means for detecting the focus of the radiant energy reflected from said eye, the improvement comprising:
    a. a digital computer;
    b. means for converting the analog signal from said detecting means to a digital signal stream fed to said computer;
    c. means responsive to said computer for varying the focus and orientation of said radiant energy pattern directed into said eye;
    d. said computer being programmed for storing selected results of said digital signal stream; and
    e. said computer being programmed to use an algorithm to calculate said refractive error from said selected signal results.

15. The apparatus of claim 14 wherein said computer is programmed to fit a sinusoidal function to said selected signal results and to calculate said refractive error from said sinusoidal function.

16. The apparatus of claim 15 wherein said computer is programmed for calculating the RMS deviation of said selected signal results from said sinusoidal function.

17. The apparatus of claim 14 wherein said computer is programmed for checking the deviation of said selected signal results from said algorithm.

18. The apparatus of claim 14 wherein said computer is programmed for selecting said signal results as representations of the eye refraction value at optimum focus of said reflected pattern.

19. The apparatus of claim 14 including means for detecting the beginning of a blink, and wherein said computer is programmed to stop examination of said eye during said blink.

20. The apparatus of claim 19 wherein said blink detecting means includes a differentiator and a threshold detector.

21. The apparatus of claim 14 wherein said computer is programmed to produce said selected signal results without moving throughout the range of focus variation for each orientation of said pattern.

22. The apparatus of claim 14 wherein said computer is programmed to vary said focus for each of a sequence of angular orientations of said pattern and to select the eye refraction value producing optimum focus for each of said angular orientations.

23. The apparatus of claim 22 wherein said computer is programmed to use said eye refraction values producing optimum focus at previous angular orientations to predict the likely regions of optimum focus for subsequent angular orientations and to vary said focus in said likely regions.

24. The apparatus of claim 14 wherein said computer is programmed for selecting said signal results as representations of the eye refraction value at optimum focus of said reflected pattern, and wherein said computer is programmed to fit a sinusoidal function to said selected signal results and to calculate said refractive error from said sinusoidal function.

25. The apparatus of claim 24 wherein said computer is programmed for calculating the RMS deviation of said selected signal results from said sinusoidal function.

26. The apparatus of claim 25 including means for detecting the beginning of a blink, and wherein said computer is programmed to stop examination of said eye during said blink.

\* \* \* \* \*